Oct. 21, 1930. D. G. PETRIE 1,778,811
ELECTRIC HEATING APPARATUS AND RESISTANCE UNITS THEREFOR
Filed Dec. 13, 1929  3 Sheets-Sheet 1
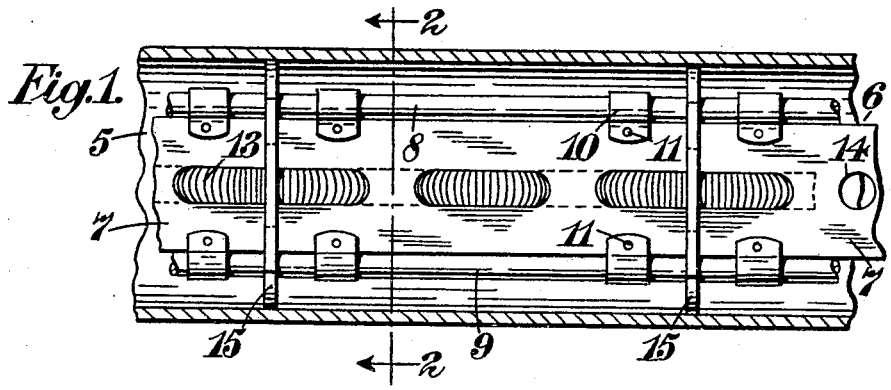
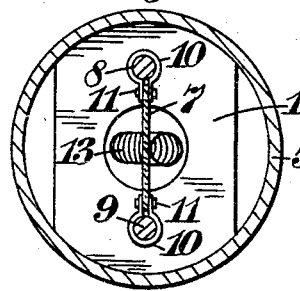
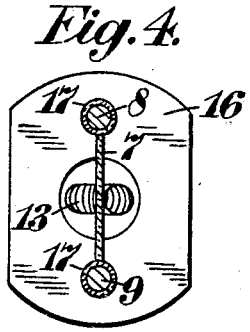
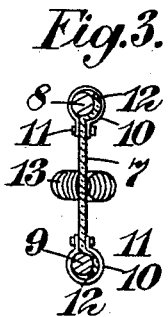
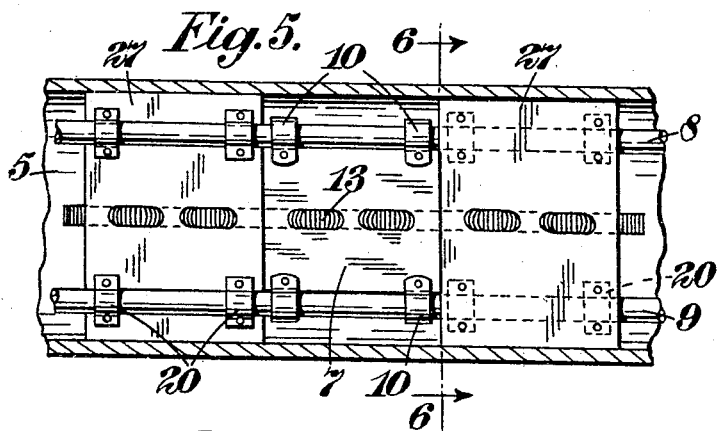
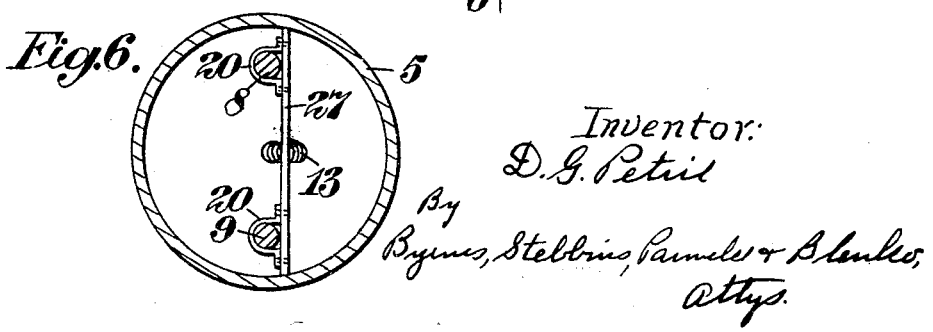

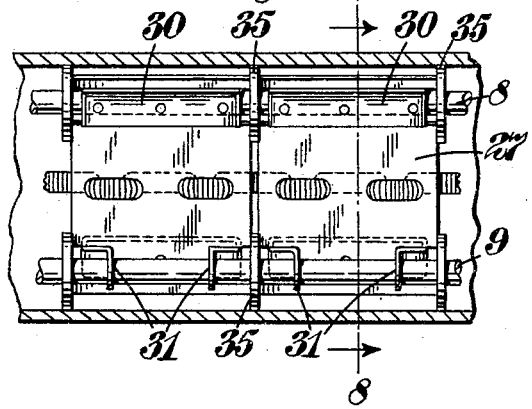
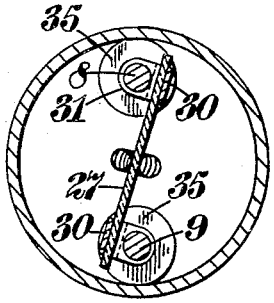
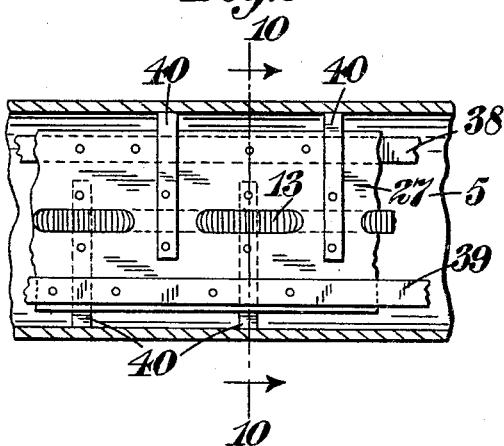
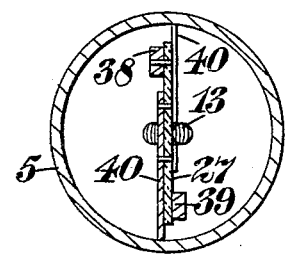
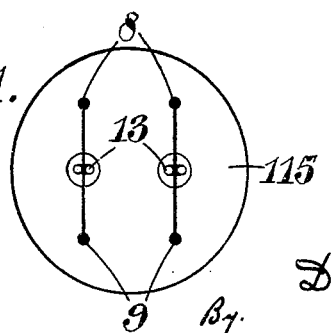

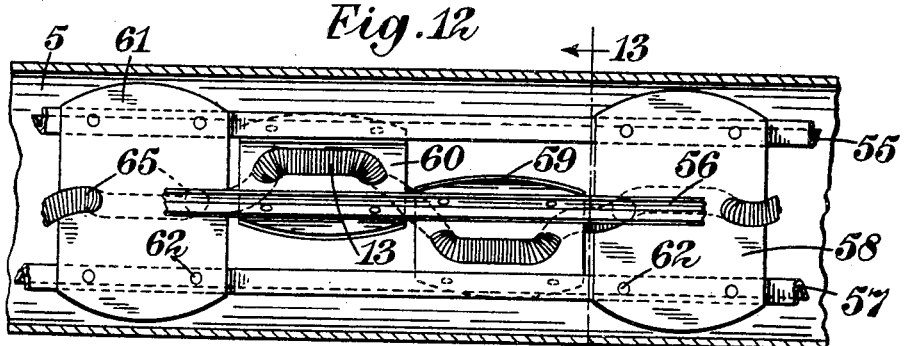
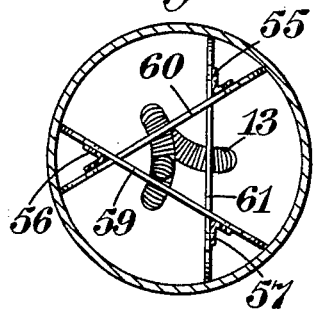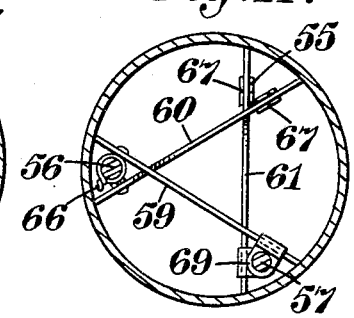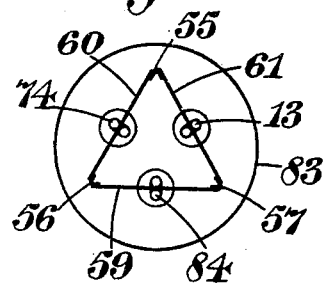
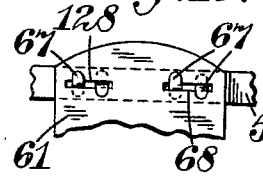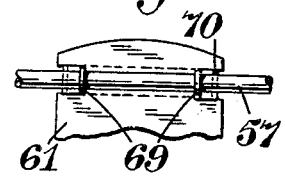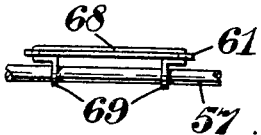
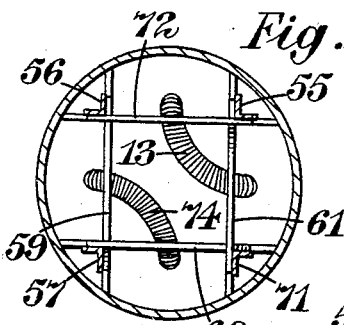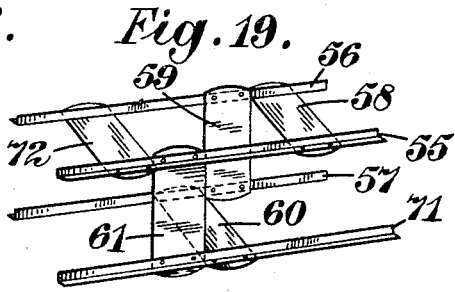
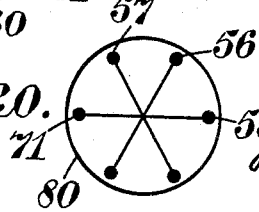

Patented Oct. 21, 1930

1,778,811

UNITED STATES PATENT OFFICE

DAVID GRANT PETRIE, OF WELWYN GARDEN CITY, ENGLAND, ASSIGNOR TO YOUNG, OSMOND & YOUNG LIMITED, OF WELWYN GARDEN CITY, ENGLAND

ELECTRIC HEATING APPARATUS AND RESISTANCE UNITS THEREFOR

Application filed December 13, 1929, Serial No. 413,818, and in Great Britain December 10, 1928.

This invention is for improvements in or relating to electric heating apparatus and to resistance units therefor. The invention is particularly applicable to electric heating apparatus of the type comprising a tubular body containing a resistance unit, which body is of a shorter or longer length, for example is such as may be placed around the walls of a room, although the invention is not restricted thereto, as it may also be used in connection with electric heaters of other constructions. One form of electric heating apparatus of this type having a tubular body is described in the United States Patent Specification No. 1,710,511, and no claim is made herein to anything described or claimed in that specification. In this known apparatus each mica plate of the resistance unit was embraced along its longitudinal edges by metallic edging of U-section, and the entire resistance unit was flexible and liable to bend during transport and when not housed in the tubular body, whilst in heating apparatus according to the present invention described hereinafter mica plates or the equivalent are secured to the outside of longitudinal members or bars extending along the plates to prevent the spreading of the bars.

It has also heretofore been proposed to provide for such heaters a resistance unit having a longitudinal supporting member in the form of a relatively wide bar carrying insulated studs constituting binding posts spaced apart along the bar and extending at right-angles thereto, heating elements in the form of flat strips being carried by the binding post.

The present invention has for one of its objects to provide an improved construction of resistance unit which shall be robust and rigid and can be readily made in long lengths.

According to the invention, there is provided a resistance unit for electric heating apparatus comprising in combination one or more longitudinal members constituting a stay or stays, a carrier in the form of a succession of pieces of insulation, for example mica, of sheet form arranged extending towards one another (e. g. lying all in one plane), attachment means, such as clips, securing said pieces of insulation to an outside face of said one or more stays, and a resistance element carried by, for example threaded through perforations in, said carrier. Each stay aforesaid may be of circular cross-section, or of any of the other sections described hereinafter.

According to a feature of the invention, two bars each constituting a stay are arranged spaced apart in parallel relation one at or near each longitudinal edge of the carrier, and attachment means, such as clips, secure the carrier to an outside face of each of said bars. When the stays referred to above are of suitable size, cross-sectional shape and material the resistance unit will be relatively rigid and not liable to bend to any appreciable extent even when constructed in relatively long lengths.

According to another feature of the invention, a resistance unit, as set forth above, is combined with insulating means carried thereby and arranged to insulate from its surroundings one or both stays that may serve as a return conductor or conductors. This insulating means may be in the form of one or more insulators, for example of mica, of plate form arranged to lie with their planes substantially at right-angles to the length of the carrier aforesaid.

According to the invention, there is also provided a resistance-unit framework for electric heating apparatus comprising in combination a plurality (e. g. three) of parallel bars, distinct one from another, the angular relationship of which is such that, viewed in end elevation, each is at an angle of a closed angular geometrical figure, for example a triangle, and a plurality of distance pieces, for example of sheet form, arranged (e. g. spaced apart) along said bars and serving to keep the bars in the angular relationship aforesaid, which bars and/or distance pieces constitute insulators or are insulated from one another, with or without one or more resistance elements mounted on the framework and preferably on said distance pieces. Such an open framework is relatively rigid and can readily accommodate one or more resistance elements.

According to a feature of the invention, the distance pieces lie each along one side of said geometrical figure seen when the framework or resistance unit is viewed in end elevation.

According to another feature of the invention, the distance pieces attached each to only two adjacent bars are arranged in a spiral about the longitudinal axis of the framework or unit.

According to a further feature of the invention, the distance pieces attached each to only two adjacent bars cross in end elevation the longitudinal axis of the framework or unit.

Other features of the invention relating to insulating the bars from their surroundings in the heater and to means for attaching the distance pieces to the bars will be described hereinafter and pointed out in the claims.

Several embodiments of the invention are diagrammatically illustrated, by way of example, in the accompanying drawing, wherein:—

Figure 1 is a longitudinal section through part of an electric heater comprising one form of resistance unit according to the invention, and Figure 2 is a vertical cross-section through the same taken on the line 2—2 in Figure 1;

Figure 3 is a vertical cross-section through a modified form of resistance unit, and Figure 4 is a like view showing another modification;

Figures 5 and 6 are longitudinal section and cross-section on the line 6—6 in Figure 5, respectively, showing another modified form;

Figures 7 and 8 are longitudinal section and cross-section on the line 8—8 in Figure 7 showing still another modified form;

Figures 9 and 10 are longitudinal section and cross-section on the line 10—10 in Figure 9 showing a further modified form, and Figure 11 is a diagram of another form.

Figure 12 is a longitudinal section through part of an electric heater, comprising one form of resistance unit in the form of an open framework according to the invention, and Figure 13 is a vertical cross-section through the same taken on the line 13—13 in Figure 12;

Figure 14 is a view corresponding to Figure 13 but showing various forms of attachment means for attaching the distance pieces to the bars;

Figure 15 is a detail view of one form of attachment means seen in side elevation, and Figures 16 and 17 are side elevation and plan view, respectively, showing another form of attachment means;

Figure 18 is a view corresponding to Figure 13 but showing another modified form of resistance unit and framework, and Figure 19 is a perspective view showing the open framework of the unit illustrated in Figure 18.

Figure 20 is a diagram showing a further modified form of framework for a resistance unit according to the invention, and Figure 21 is a diagram of another form.

Referring first to Figures 1 to 4, an electric heater comprises a frame in the form of a single tube, for example of metal, or a number of such tubes connected end-to-end, which provide a continuous tubular passage 5 that may be closed at its ends by two caps, one of which may enclose a terminal block, as described in the patent specification aforesaid.

A resistance unit of strip form comprises a carrier 6 or base in the form of a succession of pieces of insulation 7 of sheet form arranged end-to-end all in one plane, which carrier is secured to or mounted on an outside face of two longitudinal members or bars 8, 9, constituting each a stay, one lying along each longitudinal edge of the carrier 6.

In some cases only one such stay may be used, and a description of one thereof will suffice for both. Such a stay or bar may be of any convenient cross-section, for example circular, rectangular, triangular, polygonal, V-, U- or L-shaped, or annular, and may be composed of metal or of insulating material. When a stay comprises several lengths of material they may be joined together at their ends by any convenient means such as are used for connecting rods or bars end-to-end.

Any convenient form of attachment means may serve to secure the carrier to an outside face of a stay which need not necessarily be situated along an edge of the carrier. As illustrated, these means are in the form of clips 10 formed by bending a strip of material, e. g. metal, around the stay and riveting its ends together with a piece of insulation between them, as shown at 11. When this construction is used the edge of the carrier 6 may abut against the outside face of the stay or be spaced away therefrom, or, as shown in Figure 3, the marginal portions of the pieces of material may be bent to lie against the outside face of the stay, as shown at 12. When a stay of V-, L- or U-shape is used the carrier may be riveted directly to the outside face thereof, for example to a vertical limb or web of the stay.

A resistance element 13 of any convenient form, preferably a coiled wire, is mounted in any convenient manner on the carrier. For example, it may be threaded through perforations 14, or it may be supported on hooks, for example eyeleted hooks mounted on the carrier. Also, more than one resistance element may be mounted on one carrier to provide a two-heat or multiple-heat arrangement of the same.

A stay made of metal may be electrically connected to the resistance element and may serve as a return conductor. When a stay is tubular a return wire may, in some cases, be led through it from one end of the heater to a terminal at the other end.

When a bar or stay serves as an electrical conductor it must be insulated from its surroundings, such as the outer tube 5. For this purpose insulating means in the form of one or more insulators 15, for example of mica, of plate form may be arranged to lie with their planes substantially at right-angles to the length of the carrier 6. Such an insulator 15 may be threaded on the unit, as illustrated. As shown in Figure 4, a transverse plate 16 may, however, be of metal, in which case a bushing 17 of insulation will be provided on each stay at the situation where it passes through the plate, which will be perforated, for example centrally, to allow the resistance element 13 to pass freely through it without making electrical contact therewith.

Referring to Figures 5 and 6, a clip 20 of U- or saddle-shape serves to attach to the bars 8, 9 some wider pieces of insulation 27 that may alternate with narrower pieces 7 which are mounted by means of clips 10. The pieces 27, as seen in end elevation of the unit, extend beyond both the bars 8, 9 on which they are mounted and serve to insulate both these bars, which may serve as return conductors from their surroundings comprising the tube 5. Further, the pieces 27 are arranged alternately at opposite sides of the two bars 8, 9 so that they lie in different planes which are each different from that in which the pieces 7 of the same carrier lie. An advantage of this staggered arrangement of the pieces of insulation is that if the resistance element 13 should break, its ends will not run through the perforations so easily as when they lie all in one plane as in the construction shown in Figures 1 and 2. If desired, all the mica plates 27 may lie at the same side of the bars 8, 9, and the narrower plates 7 may be dispensed with.

In the construction shown in Figures 7 and 8 the mica plates 27 are carried each by a clip 30 at one side of the bar 8 and by a like clip 30 at the opposite side of the bar 9. Each of these clips 30 consists of a strip of sheet metal or other convenient material having its ends folded back on themselves and then bent in the form of lugs 31 lying at right-angles to the plane of the distance-piece embraced by the clip. Conveniently the edges of the mica plate are recessed, as shown, to receive the clip. The lugs 31 are perforated so that the clip can be readily threaded on, and slid along, a bar. If desired, some plates 27 may slope in one direction and others, e. g. alternate ones, may slope in a different, e. g. opposite, direction, thus providing a staggered arrangement of the plates. The bars 8, 9 carry each a number of insulators 35 in the form of discs or washers e. g. of mica, threaded thereon, which insulators on one bar are distinct from those on the companion bar of the same unit.

Figures 9 and 10 show a construction of resistance unit wherein metal bars 38, 39 of rectangular cross-section have a mica plate riveted to opposite outside faces thereof, as viewed in end elevation (see Figure 10). A number of metal supports 40, e. g. of spring steel, are riveted to the plate at situations remote from the bars 38, 39 and from the resistance element 13. These supports 40 extend beyond the longitudinal edges of the resistance unit and serve to support the unit in the tube 5 constituting the frame of the heater. The two upper supports 40 shown in Figure 9 are on the face of the mica plate 27 remote from the bar 38 and are consequently insulated from the latter by the mica plate and the two lower supports 40 are arranged similarly with respect to the lower bar 39 at the opposite side of the mica plate 27. Further, where the resistance element 13 crosses one of these supports 40 it lies at the side of the mica plate 27 remote from the support, as clearly shown in Figure 9. The supports 40 may be distributed in any desired manner along a resistance unit comprising any convenient number of pieces of insulation.

As shown in Figure 11, two resistance units, each of strip form and each comprising bars 8, 9, may be arranged alongside one another and have supports in the form of pieces of insulation 115, e. g. of mica, threaded on them and serving to hold them spaced apart either in parallel relation, as shown in the diagram, or with the plane of one carrier lying at an angle to the plane of the other. Obviously more than two resistance units may be arranged in an analogous manner, for example lying each along the side of a triangle as viewed in end elevation. When this construction is short only two supports 115 may be provided, one at each end of the units, in which case they may be of porcelain or the like. When the bars 8, 9 do not serve as conductors, then the supports 115 need not necessarily be of insulating material but may be of metal. Also the supports 115 need not be circular but may be of some other form, for example like the insulators 15 described above. Such a composite resistance unit can be conveniently placed in a tubular body of a heater.

When the stay or stays aforesaid do not serve as electrical conductors then the return wire will conveniently be threaded through perforations in the carrier alongside the resistance element 13.

Referring now to Figures 12 and 13, three parallel bars 55, 56 and 57 are arranged spaced apart so that, as viewed in end elevation (see Figure 13) each is at an angle of a closed angular geometrical figure, which, in this construction, is an equilateral triangle. A number of distance pieces, whereof only four are shown in Figure 12, and designated 58, 59, 60 and 61, are spaced apart along the bars 55, 56, 57 and are secured thereto in any convenient manner, as by rivets 62, and serve to keep the bars in their triangular relationship. These bars are shown as of V-section with their apices directed towards the longitudinal axis of the resistance unit, and the distance pieces are preferably composed of insulating material, such as mica. These mica plates preferably have parallel sides and curved ends which extend beyond both of the bars to which they are connected, each plate being secured to only two of the bars.

As clearly shown in Figure 13, the distance pieces lie each along one side of the triangular figure seen when the resistance unit is viewed in end elevation. It will be seen that the plate 59 lies flat on the upper webs of the bars 56 and 57, the next plate 60 lies flat on the lower webs of the bars 55 and 56, and the next plate 61 lies flat against the vertical webs of the bars 55 and 57, so that each of these distance pieces, which are of sheet form, lies with its plane parallel with the bars to which it is attached. Also each mica plate lies with its plane in a plane different from that containing either of the next two adjacent plates which also lie in different planes, so that as the plates are spaced apart along the bars there results a spiral formation of the distance pieces about the longitudinal axis of the unit. The resulting openwork framework can be readily made in long lengths, is a relatively rigid structure and can be conveniently slid endwise into the tubular body of a heater.

A resistance element 13 of any convenient form, preferably a coiled wire, is mounted in any convenient manner on the framework of the unit. Preferably it is threaded through perforations 55 in the distance pieces, but it may be supported on hooks, for example, eyeleted hooks, mounted on the distance pieces. Also, more than one resistance element may be mounted on one framework to provide a two-heat or multiple-heat arrangement.

The bars 55, 56, 57 may be of any convenient cross-section, for example circular, rectangular, triangular, polygonal, U- or L-shaped, or annular, and may be composed of metal or of insulating material. When a bar comprises several lengths of material they may be joined together at their ends by any convenient means such as are used for connecting rods or bars end-to-end. Figure 14 shows the bars 56 and 47 of circular cross-section, the distance piece 59 being attached to the bar 56 by means of a fastening wire 66 threaded through perforations in the distance piece 59 and having its ends twisted together after it has been coiled around the bar. Figures 14 and 15 show the distance pieces 60 and 61 attached to the bar 55 of V-section by means of lugs 67 that have been stamped up out of the bar, inserted through slots 128 in the distance pieces and upset on the side thereof opposite the bar. Further, in Figure 14, the distance pieces 59, 61 are shown attached to the bar 57 each by a clip 68 illustrated in Figures 16 and 17. This clip 68 consists of a strip of sheet metal or other convenient material having its ends folded back on themselves and then bent in the form of lugs 69 lying at right-angles to the plane of the distance piece embraced by the clip. Conveniently, the edges of the distance piece are recessed, as shown at 70, to receive the clip. The lugs 69 are perforated so that the clip can be readily threaded on and slid along the bar 57.

In the construction shown in Figures 18 and 19, four parallel bars 55, 56, 57 and 71 of L-section are arranged spaced apart so that, as viewed in end elevation, each is at an angle of a square. A number of distance pieces, whereof only five are shown, are attached, arranged in groups of four, each to only two bars and spaced along the same, the piece 58 being secured, as by rivets, to the two top bars 55, 56 of the square, the piece 59 being secured similarly to the two bars 56, 57 at one side of the square, the next piece 60 being similarly secured to the two bottom bars 57, 71 of the square, and the next piece 61 being similarly secured to the two bars 55, 71 at the other side of the square. The next distance piece 72 being the first of another group of four, the three following distance pieces will be arranged similarly. Two resistance elements 13 and 74 are shown threaded through perforations in the distance pieces, the element 13 being carried by those distance pieces which lie at the top and one side of the square, and the element 74 being carried by those distance pieces which lie at the bottom and the other side of the square. More or less than two resistance elements may be used, however, and they may be arranged in any convenient manner on the framework.

In each of the constructions described above with reference to Figures 12 to 19, the distance pieces, as viewed in end elevation of the unit, extend each beyond the bars on which they are mounted and, when made of insulating material, serve to insulate the bars from their surroundings in the heating apparatus in which the resistance unit is employed. When the bars are composed of insulating material, the distance pieces may, in some cases, be made of metal or of insulating material. If made of metal and used to support the resistance element they will be so carried by the bars that they are insulated from the framework of the heater when in use therein.

Alternatively, the resistance element may be carried by the bars made of insulation. Further, when the bars are made of metal and the distance pieces are also of metal, then the bars and distance pieces will be insulated from one another, for example by threading the distance pieces on to an insulating bushing carried by the bars, in which case the bars may be said to constitute insulators. Alternatively, metal distance pieces may have perforations bushed with insulating material and threaded on metal bars, in which case the metal distance pieces may be considered to constitute insulators.

Figure 21 shows another modified construction of resistance unit wherein the framework comprises bars 55, 56, 57 arranged each at the angle of an equilateral triangle; these bars are of V-section and have their channels opening inwards towards the centre of the triangle as viewed in end elevation. Pieces of insulation 60, e. g. mica, are arranged end-to-end on each pair of bars outside the latter, so that a tubular structure open at its ends and of triangular section is formed, resistance elements 13, 74, 84 being carried in any convenient manner, as by threading through perforations or on hooks, on each side of the triangular structure. This structure may be inserted directly into a tubular body of a heater, but preferably it is supported therein by means of one or more supports 83 in the form of mica discs having their planes lying transversely of the length of the bars and threaded on the latter, apertures being provided in the discs for the passage of the resistance elements. In some cases these supports 83 may be of metal, and in other cases, especially when the heater is short, they may be dispensed with, the bars 55, 56, 57 being then preferably carried in end discs, for example of porcelain or the like, in the heater. The bars 55, 56, 57 may be made of insulation, but when made of metal they may serve as return conductors for a multiple-heat arrangement. Obviously more than three such bars may be arranged at the angles of a rectangle or polygon. When the heater is of a considerable length, having for example a one-piece tubular body, say five feet long, the discs 83 will effectively prevent the bars 55, 56, 57 from sagging.

Figure 20 diagrammatically shows another modified form of resistance-unit framework wherein the distance pieces attached each to only two opposite bars cross, as viewed in end elevation, the longitudinal axis of the unit and provide a star-shaped arrangement. In this case means, such as two discs 80, one at each end of the bars, will serve to hold the latter spaced angularly apart.

When a bar is made of metal it may be electrically connected to a resistance element and may serve as a return conductor, in which case it will preferably be insulated from the frame of the heater when in use. Such an insulated metal bar may, in some cases, carry the resistance element, for example by means of hooks or other attachment means electrically connecting it with the element. This construction may also be used if desired, when the bars are of insulating material, provision then being made that the resistance element does not contact with the distance pieces if these are made of metal. When a bar is tubular a return wire may, in some cases, be led through it from one end of the heater to a terminal at the other.

The invention thus provides not only an improved construction of resistance unit having an open or skeleton framework that can be conveniently made in long lengths and is of robust construction and not liable to bend materially, but also electric heating apparatus, for example of tubular form, containing the described resistance unit.

Various modifications may be made in the details of construction described above within the scope of the invention as defined by the claims.

I claim:

1. A resistance unit for electric heating apparatus comprising in combination a plurality of longitudinally extending spaced bars, a carrier comprising a succession of sheets of insulation, means for securing said sheets of insulation to the bars to prevent spreading of the bars, and a resistance element carried by said sheets.

2. A resistance unit for electric heating apparatus comprising in combination at least two longitudinally extending spaced bars, a carrier comprising a succession of sheets of insulation, means for securing said sheets near their longitudinal edges to two of said bars to retain the sheets in a prearranged relation and to prevent spreading of the bars, and a resistance element carried by said sheets.

3. A resistance unit for electric heating apparatus comprising in combination at least two longitudinally extending spaced bars, a carrier comprising a succession of sheets of insulation, means for securing each sheet to two of said bars to prevent spreading of the bars, a resistance element carried by said carrier, and spaced insulating projections extending beyond at least one of said bars.

4. A resistance unit for electric heating apparatus comprising in combination at least two longitudinally extending spaced bars, a carrier comprising a succession of sheets of insulation, attachment means securing said sheets near their longitudinal edges to two of said bars to prevent spreading of the bars, and a resistance element carried by said carrier, some of which sheets of insulation lie in a plane different from that in which other sheets of insulation lie.

5. In electric heating apparatus, the combination of a tubular frame, a resistance unit mounted therein, which unit comprises at least two longitudinally extending spaced bars, a carrier comprising a succession of sheets of insulation, attachment means securing said sheets of insulation to the bars to prevent spreading of the bars, a resistance element carried by said carrier, and insulating means attached to said unit and serving to support the unit in said frame.

6. In electric heating apparatus, the combination of a tubular body, a framework comprising at least three bars arranged in parallel relationship therein, the angular relationship of which bars is such that, viewed in end elevation, each is at an angle of a closed angular geometrical figure, and a plurality of sheets constituting insulators arranged along said bars each being secured to two bars and serving to keep the bars in the angular relationship aforesaid, and at least one resistance element mounted on said insulators.

7. In electric heating apparatus, the combination of a tubular body, a framework comprising at least three bars arranged in parallel relationship therein, the angular relationship of which bars is such that, viewed in end elevation, each is at an angle of a triangle, and a plurality of sheets constituting insulators arranged along said bars each being secured to two bars and serving to keep the bars in the angular relationship aforesaid, and at least one resistance element mounted on said insulators.

8. In electric heating apparatus, the combination of a tubular body, a framework comprising at least three bars arranged in parallel relationship therein, the angular relationship of which bars is such that, viewed in end elevation, each is at an angle of a closed angular geometrical figure, and a plurality of sheets constituting insulators arranged along said bars, each being secured to two bars and serving to keep the bars in the angular relationship aforesaid, said sheets being arranged in a spiral about the longitudinal axis of the framework, and at least one resistance element mounted on said insulators.

In testimony whereof I affix my signature.

DAVID GRANT PETRIE.